United States Patent
Loen

(10) Patent No.: US 7,113,271 B2
(45) Date of Patent: Sep. 26, 2006

(54) METHOD TO ACCURATELY MEASURE THE ANGULAR ORIENTATION OF A ROTATING AXIS TO A REFERENCE LINE

(76) Inventor: Mark Vincent Loen, 509 Lauretta Dr., Steubenville, OH (US) 43952

( * ) Notice: Subject to any disclaimer, the term of this patent is extended or adjusted under 35 U.S.C. 154(b) by 237 days.

(21) Appl. No.: 10/776,975

(22) Filed: Feb. 12, 2004

(65) Prior Publication Data
US 2005/0041236 A1   Feb. 24, 2005

Related U.S. Application Data

(60) Provisional application No. 60/468,214, filed on May 7, 2003.

(51) Int. Cl.
*G01B 11/26* (2006.01)
*G01C 1/00* (2006.01)
*G01C 3/00* (2006.01)

(52) U.S. Cl. ............ 356/152.1; 356/139.01; 356/139.02; 356/3.01

(58) Field of Classification Search .......... 356/152.1
See application file for complete search history.

(56) References Cited

U.S. PATENT DOCUMENTS

| | | | |
|---|---|---|---|
| 5,123,736 A | 6/1992 | Pierik et al. | |
| 5,430,539 A * | 7/1995 | Lysen | 356/152.1 |
| 5,579,585 A | 12/1996 | Schaeffer | |
| 6,049,378 A | 4/2000 | Busch et al. | |
| 6,434,849 B1 * | 8/2002 | Hermann | 33/529 |
| 6,580,519 B1 * | 6/2003 | Wick | 356/614 |

* cited by examiner

*Primary Examiner*—Thomas H. Tarcza
*Assistant Examiner*—Luke Ratcliffe

(57) ABSTRACT

A method is described that measures the angular orientation of a rotational axis to a reference line. The reference line is defined by the position of a string. The alignment device includes a collimated light source that is projected approximately perpendicular to a rotating axis. The distance between the projected collimated light beam and the reference line is observed at two or more points. The distances between the reference line and light beam are then used to compute the non-perpendicular alignment angle of the rotational axis relative to the reference line. Other objects, advantages, and contributions are set forth in the disclosing embodiments of the invention.

6 Claims, 7 Drawing Sheets

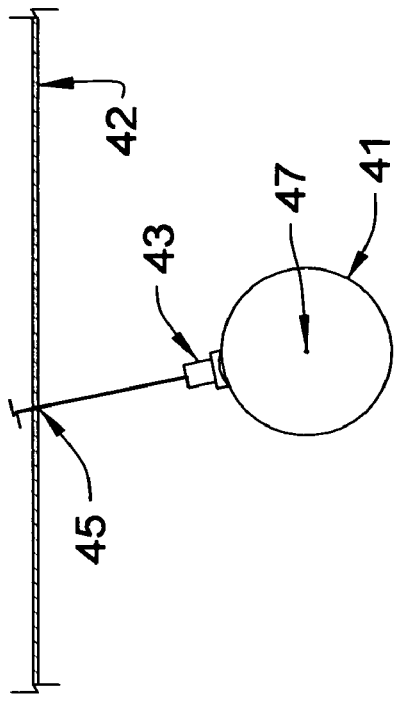
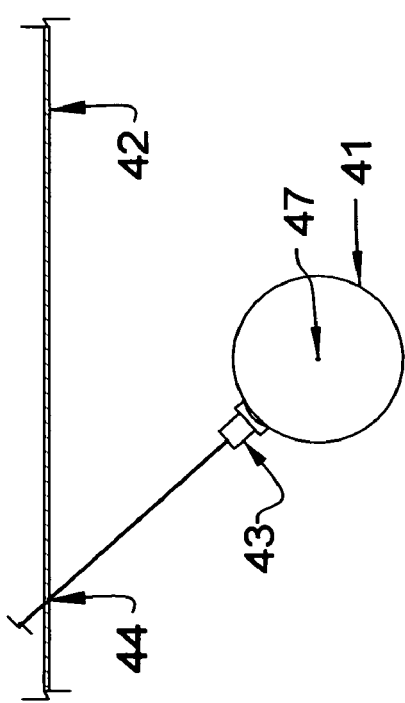
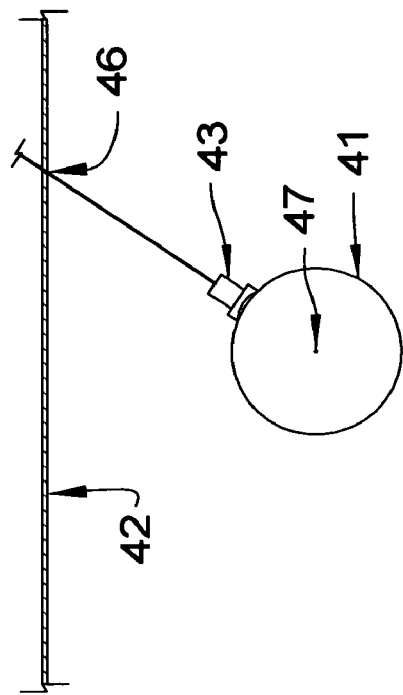

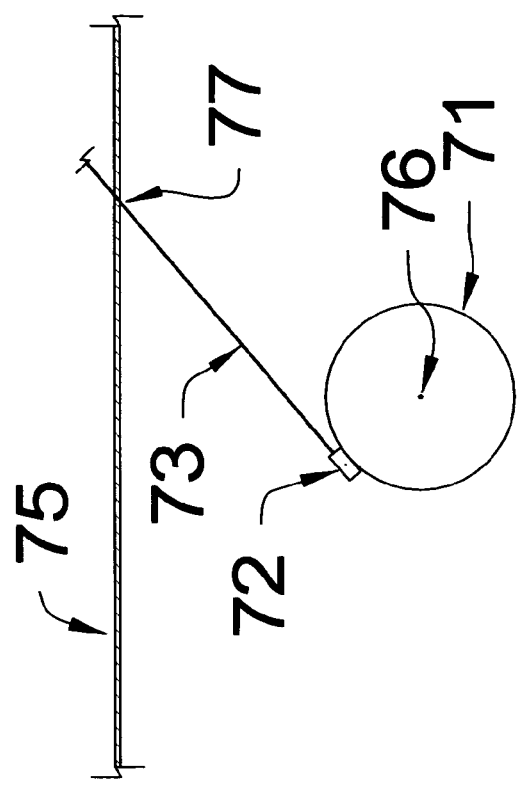
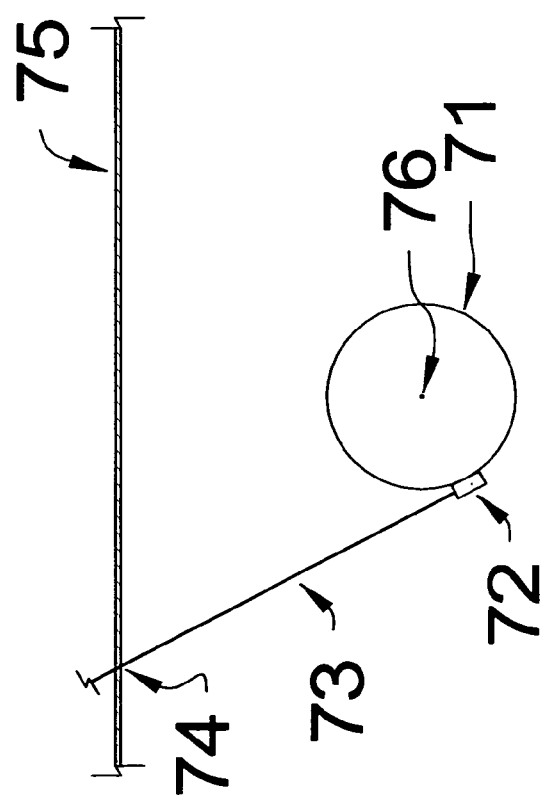

METHOD TO ACCURATELY MEASURE THE ANGULAR ORIENTATION OF A ROTATING AXIS TO A REFERENCE LINE

RELATED APPLICATIONS

This application claims the benefit of U.S. Provisional Patent Application Ser. No. 60/468,214 filed on May 7, 2003.

STATEMENT REGARDING FEDERALLY SPONSORED RESEARCH OR DEVELOPMENT

Not Applicable.

REFERENCE TO SEQUENCE LISTING, A TABLE, OR COMPUTER PROGRAM LISTING

Not Applicable.

BACKGROUND OF THE INVENTION

1. Field of the Invention

The methods and equipment of the invention are adapted to the precise measurement of perpendicularity of a rotational axis relative to a reference line. A collimated light source is rotated about an axis and the minimum distance from the light beam relative to the reference line is measured at two or more points. The non-perpendicular angle can be calculated using these distances and the position of the points and rotational axis.

The reference line is defined by points on a string or by visual targets.

The rotational axis of the collimated light source can be mounted on a base. If the edges of the base are aligned with the rotational axis of the collimated light source, the base edge angle relative to the string can be measured. If the base edge is aligned with another object, the object's angular orientation relative to the string can also be measured.

The alignment device can be easily adapted to measure the alignment of objects such as rolls, foundation bolts, structures, and processing equipment found in any industry. Surveyors, for example, will find this device very useful for a large number of important alignment measuring operations. This device is especially useful where the alignment of a number of objects relative to a common reference line such as a string need to be measured. It is also useful where the alignment of an object needs to be repeatedly measured relative to a fixed reference line, such as when the object is installed and needs to be correctly aligned.

2. Discussion of the Prior Art

The most common alignment method involves the use of surveyor methods and instruments that are oriented to an offset reference line. A survey transit, for example, is aligned to a reference line using suitable targets or markers. The transit is then rotated 90 degrees establishing a line of sight that is perpendicular to the offset reference line. A ruler is placed on at least two points of the item to be measured and the difference in ruler readings indicate how far out of alignment the item is (i.e. non-perpendicular to the offset reference line).

The accuracy of this method has been improved by using lasers, specialized optical instruments, and electronic enhancements of the appropriate surveyor equipment. However, the more accurate devices often require a lot of time to obtain the desired measurement. There can be measurement accuracy problems when the item to be measured is behind obstructions requiring the need for specialized reference setups and fixtures.

U.S. Pat. No. 5,430,539 provides for the measure of the relative alignment of two body axes for parallelism with a laser beam to fixed, electronic targets. However, this method has a number of limitations. The fixed targets create an electronic signal that requires a computer to solve a series of linear equation system with a number of equations. The alignment measurement is only relative between two body axes. There is no method disclosed for an easy, simple method for calculating alignment relative to a fixed reference line. Also, the targets must be spaced nearby the two body axes to be measured. The measurement of a large number of body axes in a processing line would require a large number of accurately placed electronic detectors. These limitations greatly reduce the practical application of this method.

BRIEF SUMMARY OF THE INVENTION

This invention provides a more direct method of measurement of the angular orientation of an axis to a reference line that avoids many of the common inaccuracies and problems associated with other methods. The invention measures the angular orientation of the rotating axis against a defined reference line by use of a reference string and a collimated light attached to the rotating axis. The angular orientation of the rotating axis can be measured by the position of the collimated light beam near the string when the collimated light is rotated about the axis.

This invention is especially suited to the measurement of roll alignment. The use of a common reference line for two or more rolls provides a highly accurate method of measuring roll to roll parallel alignment. This invention provides an angular measurement resolution that is adequate for most commercial roll alignment requirements.

BRIEF DESCRIPTION OF THE SEVERAL VIEWS OF THE DRAWINGS

FIGS. 4A–4C illustrate the use of three points to measure the angular orientation of the rotating axis to the reference line.

FIG. 7 shows the use of a collimated light source mounted on the radial surface of a roll projecting a collimated light beam that is approximately tangential to the roll rotational axis.

DETAILED DESCRIPTION OF THE INVENTION

Figure 1:
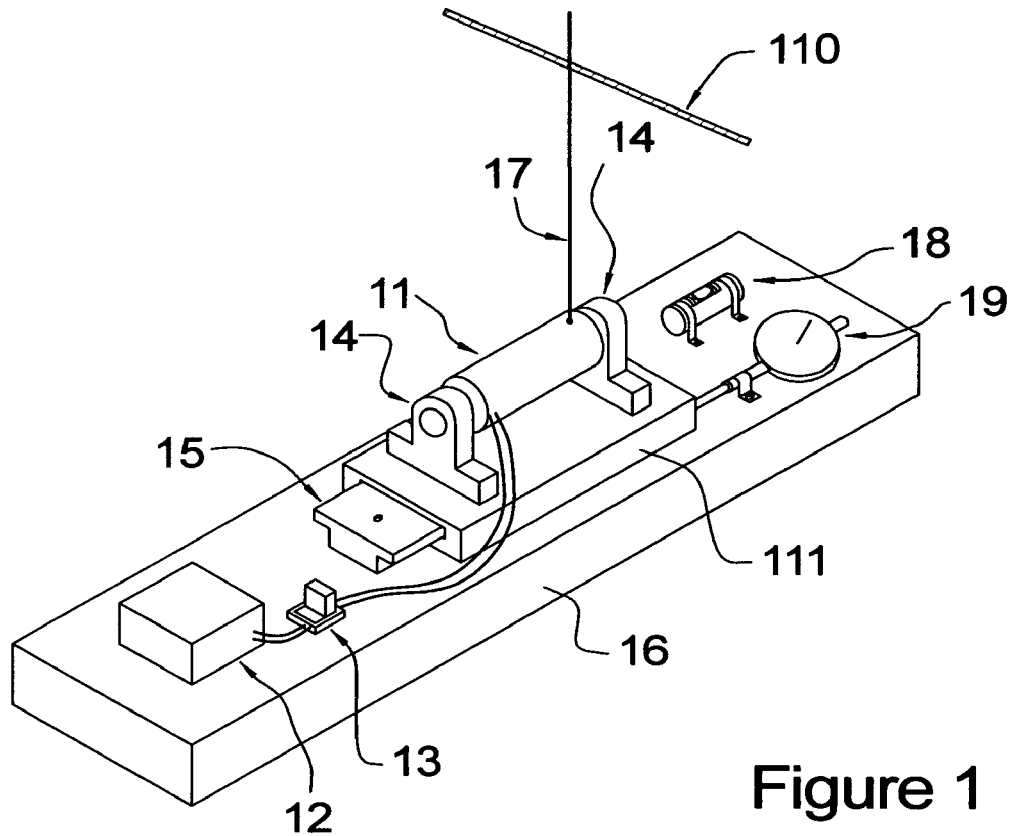
FIG. 1 shows a preferred embodiment of the alignment device. The collimated light source is a diode laser and can be rotated about two bearings shown. A mirror (not shown) projects the light beam perpendicular to the diode laser rotational axis. A switch, batteries, and bubble level are shown. The laser and mirror are mounted on a movable base with an integral position indicator.

One preferred embodiment of the alignment measuring device consists of a mounting base, a collimated light source such as a diode laser that is mounted on the base, and at least one reference string. The mounting base is positioned relative to the item to be measured, and the collimated light source is turned on. The collimated light source projects a beam away from the mounting base toward the reference string. The collimated light beam is then rotated about an axis that is mounted on the base and the path of the collimated light beam next to the reference string is observed. The distance between the beam and the reference string is used to calculate the angular orientation of rotational axis to the string by a simple equation. The angle measured is the deviation from perpendicular to the string (herein referred to as the angle $\beta$.)

The path of the collimated light beam next to the reference string is dependent on two important parameters. The first is the angle $\beta$. The second parameter is the projection angle of the collimated light beam relative to the rotational axis. The beam projection angle deviation from perpendicular is herein referred to as the angle $\theta$. A geometric description relative to the assigned coordinate system is described later.

According to the methods of this invention, $\beta$ is calculated by measuring the distance between the collimated light beam and the reference line at two or more points. Depending the magnitude of the angle $\theta$, the location of the points will need to be carefully chosen. If $\theta$ is zero, any two points on the reference line can be chosen to measure the angle $\beta$. If the angle $\theta$ is significant, two points on the reference line can be chosen that are same distance from the collimated light rotational axis. The measurement of $\beta$ is then independent of the angle $\theta$. If two points equidistant from the collimated light rotational axis are not available, three points can be used which allow both of the angles $\beta$ and $\theta$ to be computed.

Another object of the present invention is to make the minimum distance measurement between the light beam and the reference line as accurate as possible. Accordingly, one important embodiment of the invention is to allow the collimated light source to move parallel to the collimated light rotational axis. A position indicator is attached to the collimated light source. This allows the position of the collimated light beam relative to the reference line to be measured by centering the collimated light beam on the reference line at the chosen measurement points. This feature makes the alignment measurement highly precise allowing the measurement of the angle $\beta$ to have a resolution better than 0.0001 radians. Various lightweight symmetrical cardboard cutouts may be positioned on the string to provide convenient location of the string measuring points.

The reference line is defined by the location of a string. However, the reference line could also be defined by similar objects such as a wire or chain. The term "string", as used in this application, would mean narrow flexible members that stiffen under tension such as string, wire, chain, and the like.

Another preferred embodiment of the present invention is to adapt a mounting base and measuring method to determine the alignment of processing rolls used in the plastics, paper, or metals industry. In this case, the collimated light source is adapted to be mounted directly on the roll radial surface. The collimated light does not rotate about an axis on the mounting base. Instead, the mounting base and collimated light are rotated about the roll rotational axis. The measurement of $\beta$ follows the same procedure.

Another important object of the present invention is to provide for measurement of the angle $\theta$. This allows the collimated light source position on the base to be adjusted for more accurate measurements of $\beta$. It is generally desirable to set $\theta$ to as close to zero as possible.

Another important embodiment of the present invention is to measure the position of the collimated light beam electronically when it overlaps the reference string. The position accuracy using photocells or a CCD camera is a highly accurate method of centering the beam on the reference string. This makes the measurement of the angle $\beta$ highly accurate.

It is a distinct advantage to use a fixed, common reference string for measuring the alignment of multiple objects. When multiple objects are measured against the same reference string position, the parallel alignment of the objects is determined. The string provides multiple, in-line positioning points that allow for a wide variety of alignment objects and situations.

It is also an advantage to use this method to align a worn, grooved, tapered, out of round, damaged, or crowned roll. Surface imperfections only affect the angle $\theta$. The alignment angle $\beta$ can still be accurately measured by the methods of this invention.

The orientation of the string does not have to be horizontal. It can be at any angle. String sag does not affect the measurement. If the string is vertical, the rotating axis can be measured against level to gravity.

The angular measurement is based on the effect of rotating the collimated light beam. When the collimated light is rotated about the axis, the light beam projects a cone with the rotational axis as the centerline. The light beam also defines a circle at equidistant lengths of the light beam. If the angular measuring method is restricted to the use of equidistant lengths of the light beam, $\beta$ is the angle between a circle and a line. If the two reference points are equidistant from the rotational axis and on opposite sides of the rotational axis, then $$\beta = \tan^{-1}\left(\frac{X_1 - X_2}{d_{12}}\right) \quad (1)$$

where
- $X_1$ is the distance between the $1^{st}$ string reference point and the light beam
- $X_2$ is the distance between the $2^{nd}$ string reference point and the light beam
- $d_{12}$ is the distance between the two string reference points If the value of $\theta$ is zero, any two points on the reference string can be used to determine $\beta$ by equation 1.

If equidistant points are not available, and $\theta$ is unknown, the measurement of the angle $\beta$ is a little more complicated.

In this case, the location of the light beam at any point is dependent upon the unknown angles β, θ, and the location of string relative to the origin. There are three unknowns, which can be calculated by measuring the minimum distance between the reference line and the beam at three points. The calculation for θ and β for three inline points are:

$$\beta = \left(\frac{S_1(X_2 - X_3) + S_2(X_3 - X_1) + S_3(X_1 - X_2)}{S_1 d_{23} - S_2 d_{13} + S_3 d_{12}}\right) \quad (2)$$

$$\theta = \left(\frac{X_1 d_{23} - X_2 d_{13} + X_3 d_{12}}{S_1 d_{23} - S_2 d_{13} + S_3 d_{12}}\right)$$

where
- $X_1$ is the distance between the $1^{st}$ string reference point and the light beam
- $X_2$ is the distance between the $2^{nd}$ string reference point and the light beam
- $X_3$ is the distance between the $3^{rd}$ string reference point and the light beam
- $d_{13}$ is the distance between the string reference points 1 and 3
- $d_{12}$ is the distance between the string reference points 1 and 2
- $d_{23}$ is the distance between the string reference points 2 and 3
- $S_1, S_2, S_3$ are the distances between the respective string reference points and the rotational axis of the collimated light
- β and θ are in radians The invention can be adapted by those skilled in the art to include other measuring schemes not explicitly stated herein. For example, the mounting base can be lifted up, rotated 180 degrees, and placed in the same measuring position for a recheck at the same two reference points. The change in the measurement of the angle β is due to the amount of angle θ. Also, the base can be flipped upside down and the same reference points re-checked. This also determines the value of θ. Various adaptations can be made to check on the values of θ or β. In all cases, at least two reference points will be needed, the same reference point will be checked more than once, or the collimated light beam will be placed in a known position relative to at least one reference point.

More than one string could be used to define the reference line. In a preferred embodiment, vertical strings can be positioned slightly offset relative to a horizontal string, and the measuring points chosen on the vertical strings. This adaptation can be very helpful when the main reference string is not in a proper line of sight.

The position of the collimated light source on the base may be indicated by various kinds of electronic, mechanical, or visual scales. Various zeroing methods can be employed to simplify the computations.

The mounting base, collimated light source, and rotating axis can be placed in a controlled measuring environment and the position of the rotating axis relative to the base can be carefully measured and adjusted. This allows the unit to be calibrated to reduce the value of θ, making the measurement of β easier. Various jigs, fixtures, levels, instruments, strings, and targets can be used.

Based on laboratory measurements, the collimated light beam can be centered on the string less than 4% of the beam diameter at the string. For example, a beam with a 0.1" diameter had a centering repeatability within ±0.004" at a 99% confidence level. The small resolution is found by comparing the brightness of the two halves of the beam image after it passes by the string. The two circle segments are equal in brightness when the beam is centered on the string. This feature makes the angular resolution of the invention very small provided there is a large distance between reference points.

It is important that any axial motion of the collimated light source parallel to the rotational axis is minimized or carefully measured. If necessary, a dial indicator can be placed on the end of the rotating axis to ascertain this. Any motion should be included in the computation of β and θ.

On a roll, it is possible to measure β by mounting the collimated light source directly on the radial surface without a mounting base. β can be measured if care is taken to ensure that θ is a small value. This is not a highly accurate method of determining β due to difficulties in setting θ to a low value.

The mounting base does not have to be a complicated design. The mounting base could be any type of fixture that rigidly secures the collimated light source to the object to be measured. Magnets, straps, Velcro, adhesive tapes, glue, various curved shapes, and clamps may be used. Generally, it is preferred that a machined, solid material is used as the mounting base. The base can incorporate any number of matching edges or surfaces to provide for the measurement of the angular orientation of an object. The base edges could be at any angle to the rotational axis.

The reference string is placed in position by other methods. A survey team, for example, may locate the reference string end positions using suitable markers. In a preferred embodiment, the string is placed in a manner that provides a common reference line for multiple objects to be measured.

It is well known that pointing lasers such as diode lasers are subject to minor amounts of thermal drift. As they warm up, θ may vary to a small extent. Also, ambient temperature changes can also cause minor θ variances. This is not a practical concern for this invention. The device can be warmed up, if necessary, and the distance readings from the collimated light beam to the reference points can be taken in rapid succession before thermal drift becomes an issue.

The collimated light source does not have to project a light beam that is in a line that intersects the rotational axis. The collimated light source may be mounted on the surface of a roll and project a light beam that is tangent to the circumference of the roll body. The geometry in this case is somewhat different, but the computations are similar. This geometry can be preferred in some alignment situations.

FIG. 1 shows a preferred embodiment of the invention. A collimated light source (11), such as a diode laser, is powered by a battery pack (12), and turned on using a switch (13). The collimated light source (11) is mounted between two bearings (14) which are attached to a movable base (111) on a rail (15) rigidly fixed to a larger base (16). The larger base (16) can be temporarily aligned or attached to an object to be measured against the reference string (110). The collimated light source (11) projects a light beam (17) toward the reference string (110). For convenience, a bubble level (18) is added. The mounting base does not have to be level for this method to work. A dial indicator (19) indicates the position of the movable base (111). The dial indicator reading is taken at each measuring point when the collimated light beam (17) is centered on the reference string (110).

Figure 2:
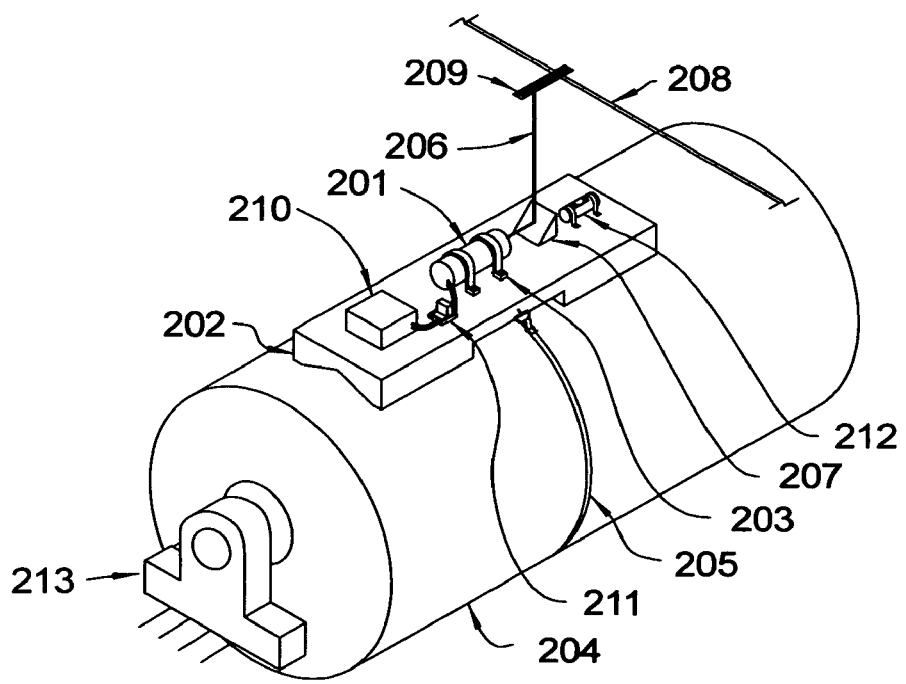
FIG. 2 shows another preferred embodiment of the alignment device. The device has been adapted to measure the angular orientation of a roll to a reference string. The mounting base has a v groove so that the device is aligned with the roll rotational axis.

FIG. 2 shows another preferred embodiment of the invention. In this case, the invention has been adapted to measure the alignment of a roll rotational axis. A collimated light source (201) is attached to a mounting base (202) by brackets (203). The base (202) is temporarily attached to a roll (204) that is mounted on bearings (213). A strap (205) holds the base (202) in place. The collimated light beam (206) bounces off mirror (207) and is directed toward the reference string (208). A ruler (209) is used to measure the distance between the light beam (206) and the string (208). A battery pack (210) powers the collimated light source (201) through an electrical switch (211). A bubble level (212) is added to the mounting base (202) to facilitate convenient measurement of the roll (204) level.

The mounting base in FIG. 2 can be adapted to allow movement of the collimated light source and mirror in a direction parallel to the roll rotational axis in a manner similar to FIG. 1. In this case, the movement can be indicated by a dial indicator, vernier scale, or other measuring device.

Figure 3C:
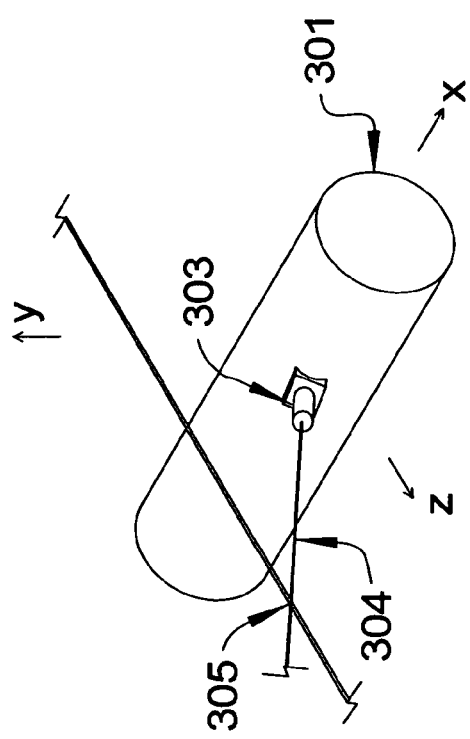
FIGS. 3A–3C illustrate the use of two points to measure the angular orientation of the rotating axis to the reference line.
Figure 3B:
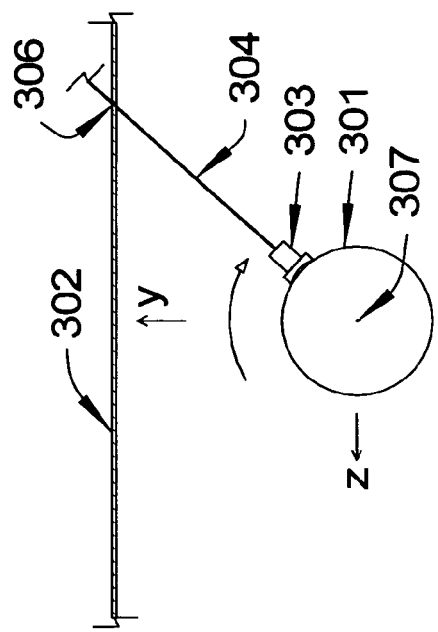
Figure 3A:
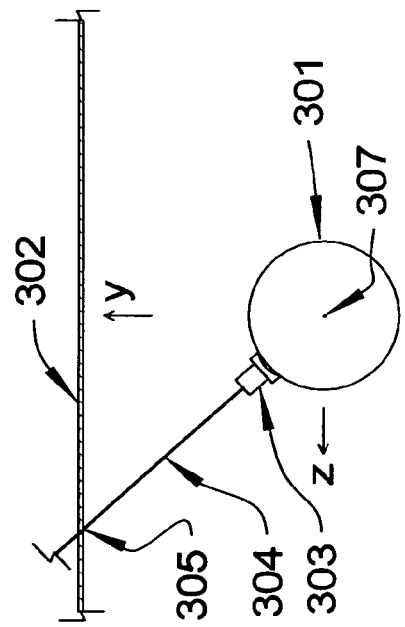

FIG. 3A shows an end view of a collimated light source (303) attached to a roll (301) by magnetic means (not shown). The roll has a rotational axis (307) through support bearings (not shown). The collimated light source (303) projects a light beam (304) toward a reference string (302) at reference point (305). FIG. 3B shows an end view of the roll (301) rotated clockwise to a new position where the collimated light source (303) projects a light beam (304) toward the reference string (302) at a new reference point (306). FIG. 3C shows an isometric view of the roll (301), collimated light source (303), light beam (304), and reference point (305).

FIGS. 4A, 4B, and 4C show the use of a three point measuring method. FIG. 4A shows a collimated light source (43) attached to a roll (41) which rotates about an axis (47). The collimated light source (43) projects a collimated light beam toward reference point (44). The minimum distance between the collimated light beam and the reference string (42) is then noted. The roll is then rotated about its axis (47) to the position shown in FIG. 4B. The collimated light source (43) projects a collimated light beam toward reference point (45). The minimum distance between the collimated light beam and the reference string (42) is then noted. The roll is then rotated about its axis (47) to the position shown in FIG. 4C. The collimated light source (43) projects a collimated light beam toward reference point (46). The minimum distance between the collimated light beam and the reference string (42) is then noted. The three measurements are then used to calculate the angles β and θ.

Figure 5:
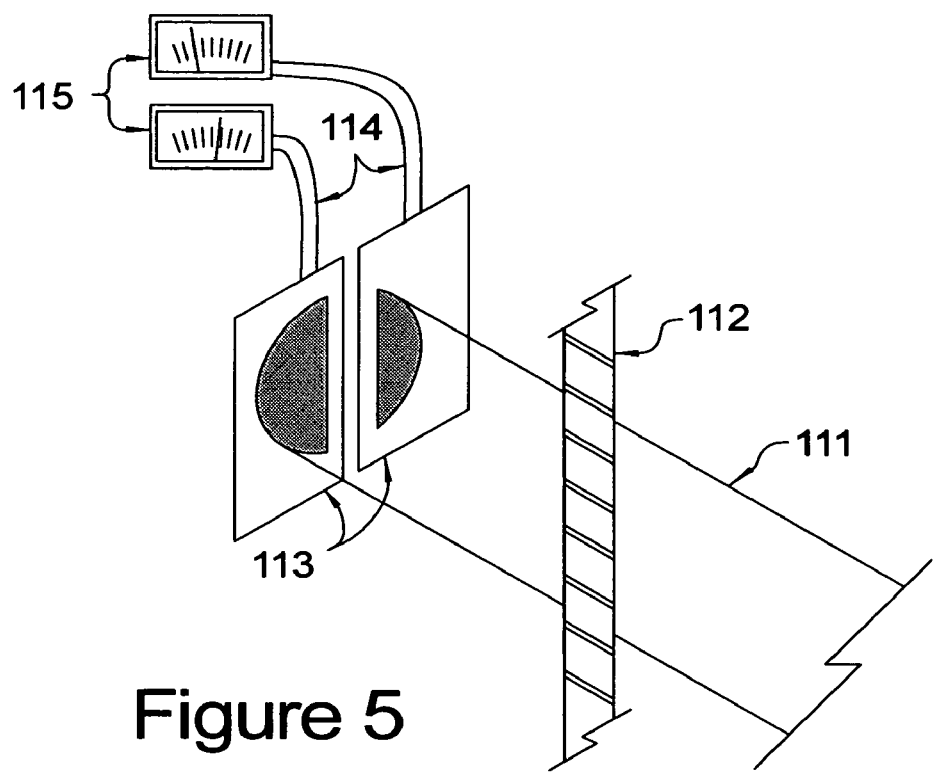
FIG. 5 shows the use of two photocells to determine if the collimated light beam is centered on the reference string.

FIG. 5 shows a close up view of the collimated light beam (111) and the reference string (112). Two photocells (113) measure the amount of light that falls on them from the projection of the collimated light beam (111) past the reference string (112). The relative output of the photocell currents is connected by wires (114) to indicators (115) and is used to determine if the collimated light beam (111) is centered on the reference string (112).

Figure 6:
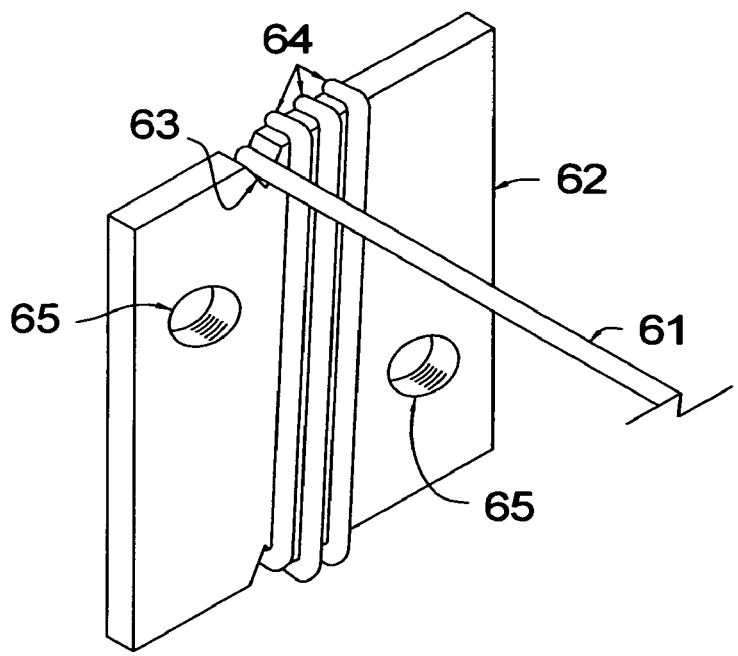
FIG. 6 shows a preferred mounting plate that accurately positions the end of a reference string.

FIG. 6 shows a preferred method that ensures high repeatability when placing the reference string (61) in position. An endplate (62) is machined to include a notch (63) where the reference string (61) is located. Extra reference string length can be wound around the endplate (62) in a manner shown (64). Mounting holes (65) are used to position the endplate (62) in a fixed manner. Care must be taken to ensure that only one reference string thickness is in notch (63) as shown.

FIG. 7A shows the use of a collimated light source (72) which is attached to the radial surface of a roll (71). The collimated light source (72) projects a collimated light beam (73) toward reference string (75) at a chosen point (74) in a tangent manner from the roll (71) surface. The minimum distance between the collimated light beam (73) and the reference string (75) is noted. The roll (71) is then rotated about its rotational axis (76) to a new position shown in FIG. 7B. The collimated light source (72) projects a collimated light beam (73) toward reference string (75) at a chosen point (77) in a tangent manner from the roll (71) surface. The minimum distance between the collimated light beam (73) and the reference string (75) is noted. The two measurements of the minimum distance are then used to determine the angular alignment of the roll rotational axis (76) to the reference string (75).

Figure 8A:
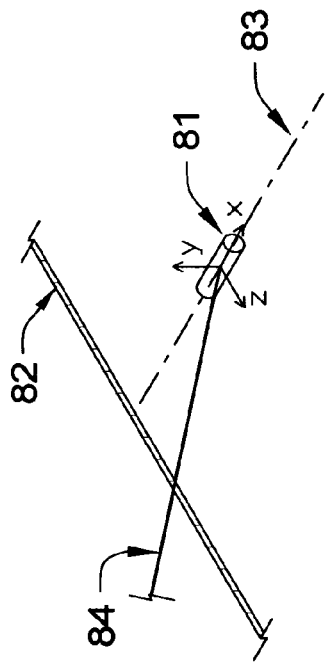
FIGS. 8A–8D show the axis orientation angle, collimated light projection angle, and the location of the origin for a collimated light source that projects a collimated light beam in a radial direction from the rotating axis.
Figure 8B:
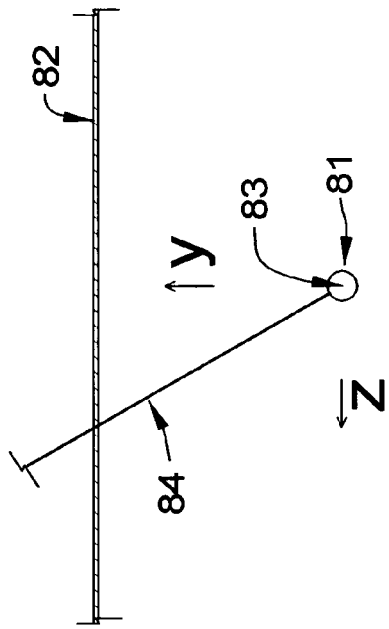
Figure 8D:
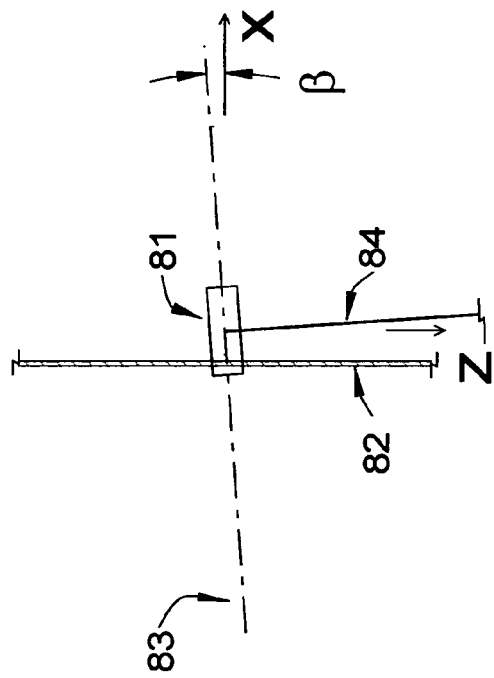
Figure 8C:
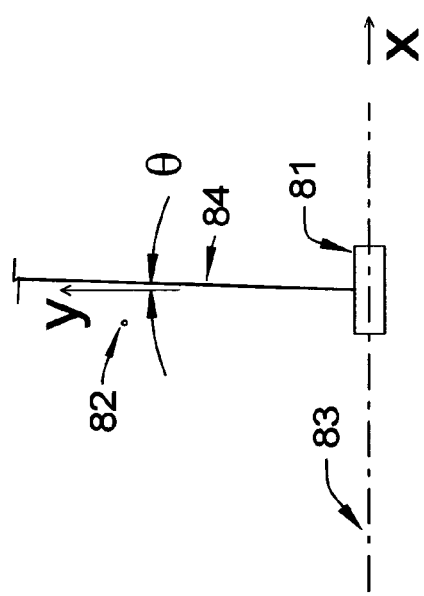

FIGS. 8A–8D shows the coordinate system and the definitions for the angles θ and β for a radial collimated light beam projection. FIG. 8A shows an isometric view of the coordinate system. FIG. 8B shows an end view of the y-z plane. FIG. 8C shows a side view of the x-y plane. FIG. 8D shows a top view of the x-z plane. A collimated light source (81) projects a collimated light beam (84) from a rotating axis (83) toward a reference string (82). The z axis is parallel to the reference string (82). The y axis is parallel to the minimum distance from the rotational axis (83) to the reference string. The origin is the intersection of the backward projection of the collimated light beam and the rotational axis (83). The x axis is then extends from the origin perpendicular to the y and z axis making a right hand orthogonal coordinate system. The angle θ is measured from the y axis to the collimated light beam (84) when β is zero. The angle β is measured from the rotational axis (83) to the x-axis in the x-z plane. β and θ are both shown in their positive directions. The distance between the collimated beam and the string is:

$$X = S\theta + Z\beta - X_0 \qquad (3)$$

where

X is the distance between the string reference point and the light beam

S is the distance between the string reference point and the rotational axis

Z is the position of the reference point in the z axis direction $X_0$ is the position of the reference string in the x axis direction Small angle assumptions are used for equation 3.

Figure 9A:
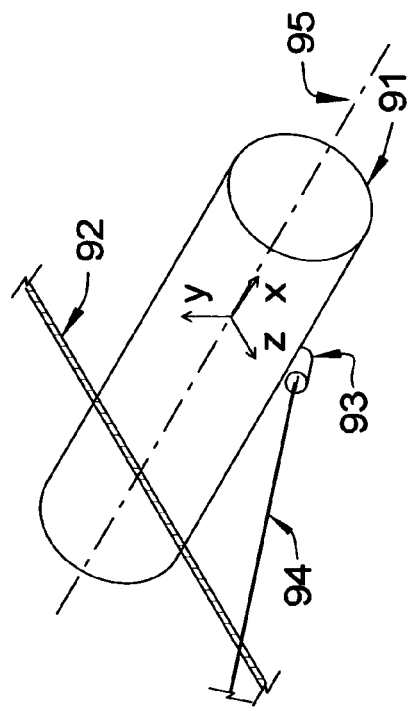
FIGS. 9A–9D show the axis orientation angle, collimated light projection angle, and the location of the origin for a collimated light source that projects a collimated light beam in a tangential direction from the rotating axis at a distance r from the rotating axis.
Figure 9B:
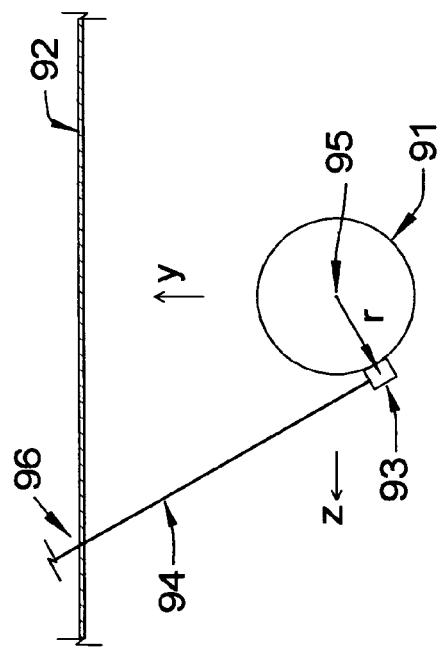
Figure 9D:
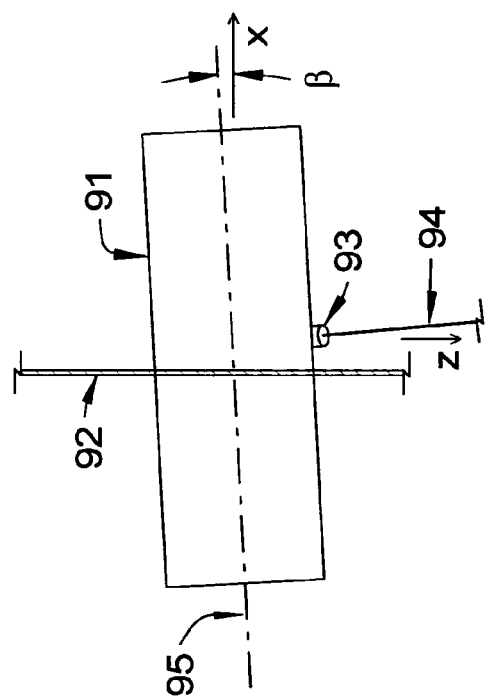
Figure 9C:
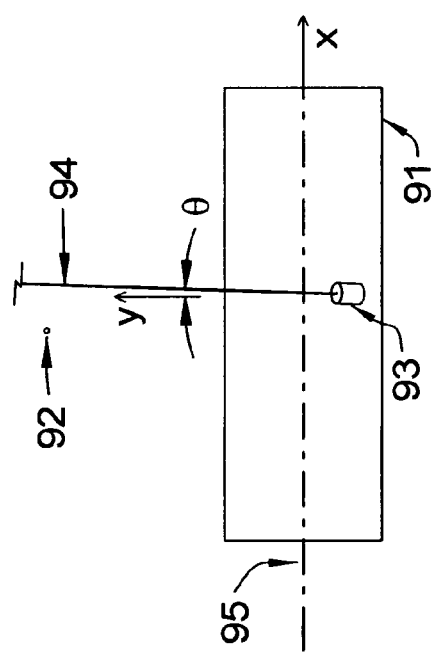

FIGS. 9A–9D shows the coordinate system and the definitions for the angles θ and β for a different collimated light source orientation. FIG. 9A shows an isometric view of the coordinate system. FIG. 9B shows an end view of the y-z plane. FIG. 9C shows a side view of the x-y plane. FIG. 9D shows a top view of the x-z plane. A collimated light source (93) is attached to a roll (91) that can be rotated about axis (95) at a distance r from the rotational axis (95). The collimated light source (93) projects a collimated light beam (94) toward reference string (92). The collimated light beam is at a right angle to the radial distance from the rotational axis (95). The z axis is parallel to the reference string (92). The y axis is parallel to the minimum distance from the rotational axis (95) to the reference string (92). The origin is the intersection the rotational axis (95) and the minimum distance to the collimated light source (93). The x axis extends from the origin perpendicular to the y and z axis making a right hand orthogonal coordinate system. When θ is zero, and there is no rotation about the rotational axis, the collimated light source projects a beam parallel to the y axis.

The angle θ is measured from the y axis to the collimated light beam (94) when β is zero. The angle β is measured from the rotational axis (95) to the x-axis in the x-z plane. β and θ are both shown in their positive directions. The distance between the collimated beam and the string is:

$$X = S'\theta + Z\beta - X_0 \qquad (4)$$

where

S' is the distance between the string reference point and the light beam position at the distance r from the rotational axis The other symbols have the same meaning as equation 3 and small angle assumptions were used. Equations 1 and 2 are then used to determine the value of β provided that the value of S' is used for each reference point instead of S.

While various embodiments of the present invention have been described, the invention may be modified and adapted to various angular alignment measurements to those skilled in the art. Therefore, this invention is not limited to the description and figures shown herein, and includes all such changes and modifications that are encompassed by the scope of the claims.

I claim:

1. The method of measuring the orientation angle of a rotational axis to a reference line comprising:
   a. at least one reference string aligned to said reference line,
   b. a collimated light source that is rotated about said rotational axis where a collimated light beam from said collimated light source is projected toward said at least one reference string,
   c. a portable base that is attached to said collimated light source where said portable base does not move parallel to said rotational axis,
   d. where said collimated light source is movable on said portable base substantially parallel to said rotational axis and said collimated light source movement on said portable base is measured relative to said portable base with a scale,
   e. the relative position between said collimated light source and said reference line is determined at a plurality of locations on said reference line by use of said scale, by use of said at least one reference string, and by use of said collimated light beam, and
   f. the distance between said locations is known, whereby said orientation angle of said rotational axis to said reference line is determined.

2. The method as set forth in claim 1 where said relative position between said collimated light source and said reference line is further evaluated by using the electronic current output of two photocells which are separated by a distance that is smaller than the diameter of said reference string when said collimated light beam contacts said reference string.

3. The method as set forth in claim 1 where said relative position between said collimated light source and said reference string is further evaluated by using a CCD camera when said collimated light beam contacts said reference string.

4. The method as set forth in claim 1 where at least one end of said reference string is located with a fixed mounting plate with a groove.

5. The method as set forth in claim 1 where a level indicator is attached to said portable base.

6. The method as set forth in claim 1 where
   a. three said locations are chosen on said reference line,
   b. the distances between said three locations are known,
   c. the distances between said three locations and said rotational axis are known, whereby non-perpendicular projection angle of said collimated light beam relative to said rotational axis is determined.

* * * * *